(12) United States Patent
Reitsma

(10) Patent No.: US 10,295,694 B2
(45) Date of Patent: May 21, 2019

(54) INDUCTIVE SENSING WITH DIFFERENTIAL INDUCTANCE READOUT

(71) Applicant: TEXAS INSTRUMENTS INCORPORATED, Dallas, TX (US)

(72) Inventor: George Reitsma, Redwood City, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 312 days.

(21) Appl. No.: 15/255,145

(22) Filed: Sep. 2, 2016

(65) Prior Publication Data

US 2017/0059735 A1    Mar. 2, 2017

Related U.S. Application Data

(60) Provisional application No. 62/213,252, filed on Sep. 2, 2015.

(51) Int. Cl.
G01V 3/10 (2006.01)
G01D 5/22 (2006.01)
G01D 5/243 (2006.01)

(52) U.S. Cl.
CPC ............ *G01V 3/101* (2013.01); *G01D 5/22* (2013.01); *G01D 5/2208* (2013.01); *G01D 5/243* (2013.01)

(58) Field of Classification Search
CPC ........ G01V 3/101; G01V 3/102; G01V 3/104; G01V 3/105; G01V 3/14; G01D 5/243; G01D 5/2208; G01D 5/22
See application file for complete search history.

(56) References Cited

U.S. PATENT DOCUMENTS

| 4,843,259 A | 6/1989 | Weisshaupt |
| 7,772,839 B2 | 8/2010 | Watson et al. |

(Continued)

FOREIGN PATENT DOCUMENTS

| DE | 3014416 A1 | 1/1981 |
| EP | 0371261 A2 | 6/1990 |
| GB | 2517152 A | 2/2015 |

OTHER PUBLICATIONS

PCT Search Report for Application No. PCT/US 2016/050238, dated Dec. 8, 2016.

(Continued)

*Primary Examiner* — Jung Kim
(74) *Attorney, Agent, or Firm* — Andrew Viger; Charles A. Brill; Frank D. Cimino

(57) ABSTRACT

For inductive sensing (such as for proximity switching), differential inductance readout is based on Sense/Reference resonators implemented as LC-ring oscillators, with $L_S/L_R$ inductor coils and a shared (time-multiplexed) resonator capacitor. The ring oscillators include matched Lsense/Lref drivers time-multiplexed (by out enable signals), to provide Lsense/Lref resonator excitation signals to the Lsense/Lref resonators, based on resulting Lsense/Lref resonance measurements (such as of resonance state) acquired by the ring oscillators from the Lsense/Lref resonators. Differential readout data is based on the time-multiplexed Lsense/Lref resonance measurements, corresponding respectively to $L_S/L_R$ coil inductances (such as based on Lsense/Lref resonator oscillation frequency). The ring oscillators can be implemented with a Schmitt trigger, converting analog resonance measurements into digital input to the Lsense/Lref drivers. Driver matching and layout matching can be used to improve accuracy. Effects of parasitic capacitance at the (Continued)

driver outputs can be suppressed by shorting or bootstrapping across the inactive $L_S/L_R$ coil inductances.

21 Claims, 6 Drawing Sheets

(56) References Cited

U.S. PATENT DOCUMENTS

| | | |
|---|---|---|
| 9,088,261 B2 | 7/2015 | Reitsma |
| 2006/0255794 A1 | 11/2006 | Lee |
| 2009/0140728 A1 | 6/2009 | Rollins |
| 2009/0267596 A1 | 10/2009 | Wang et al. |
| 2011/0084729 A1* | 4/2011 | Yoko .................. G11C 5/02 |
| | | 326/56 |

OTHER PUBLICATIONS

EU Search Report for Application No. 16843125.2-1022/3345007, dated Nov. 7, 2018.

* cited by examiner

INDUCTIVE SENSING WITH DIFFERENTIAL INDUCTANCE READOUT

CROSS-REFERENCE TO RELATED APPLICATIONS

Priority is claimed under 37 CFR 1.78 and 35 USC 119(e) to US Provisional Application 62/213,252, filed Sep. 2, 2015, which is incorporated by reference.

BACKGROUND

Technical Field

This Patent Disclosure relates generally to inductive sensing, and more particularly to resonant inductive sensing.

Related Art

Inductive sensors are used to detect/measure events/conditions based on changes in a sensing B-field. The inductive sensor includes a sense (inductor) coil, coupled to an inductance-to-data converter (IDC). The IDC drives the sense coil to project the sensing B-field, and acquires sensor measurements (readout) through the sense coil corresponding to changes in the projected B-field caused by a sensed event/condition.

For example, inductive proximity sensor/switches detect the proximity of a conductive target to the inductive sensor, within a defined proximity switching threshold. Inductive proximity sensors/switches have sufficient dynamic range to detect proximity with nano-meter resolution. However, switching accuracy is limited by temperature drift and component tolerances.

Inductive sensing, including inductive proximity sensing, can be implemented based on resonant sensing in which the inductive sensor includes a sensor resonator with an inductor coil and a series/parallel capacitor (LC tank circuit), with losses in the sensor resonator characterized by a series resistance Rs (loss factor). The IDC drives the sensor resonator to maintain a resonance state (sustained oscillation), projecting a sensing B-field, and acquires sensor measurements corresponding to sensor response to a proximate target as reflected in changes in the resonance state of the sensor resonator.

Sensor resonator response manifested as changes in resonance state can be based on either: (a) measuring changes in sensor resonator losses due to eddy current losses in the target (eddy current sensing), manifested as an increase in sensor resonator impedance, or (b) measuring a change in sense coil inductance due to eddy current back emf, manifested as a change in sensor resonator oscillation frequency. In the case of resonator losses, the resonator loss factor Rs can be characterized by an equivalent parallel impedance Rp (Rp=(1/Rs)*(L/C)), which takes into account frequency-dependent LC reactive impedance, so that changes in total resonator impedance 1/Rp can be measured as a change in the negative impedance −1/Rp required to counterbalance resonator impedance and maintain resonance (sustained oscillation). In the case of resonator inductance, back emf caused by the induced eddy currents effectively changes sensor coil inductance, manifested as a corresponding change in resonator oscillation frequency required to maintain resonance (sustained oscillation). Design considerations include required sensitivity and tolerance for temperature effect: eddy current sensing based on sensor resonator losses is more sensitive, but sensor inductance is less susceptible to temperature effects.

For example, for two identical sensor resonators used in a multi-channel configuration with a single IDC, even if resonator capacitor mismatch is reduced to 0.1% for both LC tanks, the resulting distance error can be 1% of coil diameter.

While this Background information references inductive proximity sensing, the Disclosure in this Patent Document is more generally directed to inductive sensing for applications other than proximity sensing.

BRIEF SUMMARY

This Brief Summary is provided as an introduction to the Disclosure provided by the Detailed Description and Drawings, summarizing aspects and features of the Disclosure. It is not a complete overview of the Disclosure, and should not be interpreted as identifying key elements or features of, or otherwise characterizing or delimiting the scope of, the disclosed invention.

The Disclosure describes apparatus and methods for inductive sensing with differential inductance readout based on sense/reference LC-ring oscillators with a shared resonator capacitor, such as can be used for inductive proximity sensing/switching.

According to aspects of the Disclosure, the inductive sensing methodology is suitable for use with sense/reference sensing methodology, the Lsense/Lref resonators including sense/reference inductor coils $L_S/L_R$, and including a common (shared) resonator capacitor Cc. The methodology includes: (a) driving the Lsense resonator as a time-multiplexed Lsense ring oscillator, including driving time-multiplexed Lsense resonator excitation signals into the Lsense resonator, to maintain Lsense resonator oscillation, based on resulting time-multiplexed Lsense resonance measurements input to the Lsense ring oscillator from the Lsense resonator; and (b) driving the Lref resonator as a time-multiplexed Lref ring oscillator, including driving time-multiplexed Lref resonator excitation signals into the Lref resonator, to maintain Lsense resonator oscillation, based on resulting time-multiplexed Lref resonance measurements input to the Lref ring oscillator from the Lref resonator; and (c) time-multiplexing the operation of the Lsense and Lref ring oscillators to enable sharing the common resonator capacitor Cc by the Lsense and Lref resonators. Differential readout data is provided based on the time-multiplexed Lsense and Lref resonance measurements, corresponding respectively to inductances of the $L_S$ and $L_R$ inductor coils.

In other aspects of the Disclosure: (a) the Lsense resonance measurements correspond to a resonance state of the Lsense resonator, including a resonance state with steady-state oscillation, and the Lref resonance measurements correspond to a resonance state of the Lref resonator, including a resonance state with steady-state oscillation; (b) the differential readout data is based on Lsense and Lref resonator oscillation frequency, as related respectively to the inductances of the $L_S/L_R$ inductor coils; (c) the LC-ring oscillators can be implemented with a Schmitt trigger coupled to the LCOM input to convert time-multiplexed Lsense/Lref resonance measurements, to digital Schmitt trigger output, based on predetermined high and low thresholds, provided to the Lsense/Lref drivers; and (d) parasitic capacitance can be suppressed by one of selectively shorting an inactive one of the inductor coils, or selectively bootstrapping a voltage from the common resonator capacitor Cc across an inactive one of the inductor coils.

Other aspects and features of the invention claimed in this Patent Document will be apparent to those skilled in the art from the following Disclosure.

BRIEF DESCRIPTION OF THE DRAWINGS

FIG. 4 illustrates an example embodiment in which the LC-ring oscillators include shorting switches [Ssense, Sref] connected across the $L_S$ and $L_R$ inductor coils to selectively short the disabled resonator; and FIG. 5 illustrates an example embodiment in which the LC-ring oscillators include shorting switches [Ssense, Sref] connected in series with respective bootstrap buffer amplifiers [535, 537], across the $L_S$ and $L_R$ inductor coils to selectively bootstrap the common capacitor voltage across the disabled resonator.

DETAILED DESCRIPTION

This Description and the Drawings constitute a Disclosure for inductive sensing with differential inductance readout based on sense/reference LC-Ring oscillators with a shared capacitor, including describing example embodiments, and illustrating various technical features and advantages.

Example applications for inductive sensing according to this Disclosure include proximity switching based on a difference or ratio of the differential sense/reference inductance readout, and applications such as weight scales where a ratio of the differential sense/reference inductance readout can be used directly.

As used in this Disclosure, including the Claims, LC-ring oscillator refers to a ring (time-delay) oscillator in which an LC resonator is a delay element (in the example embodiments, the dominant delay element), Resonance measurements refer to measurements of the resonance state of an LC resonators, including a resonance state with steady-state oscillation, such as based on resonator oscillation frequency at resonance.

In brief overview, inductive sensing (such as for proximity switching) provides differential inductance readout based on Sense/Reference resonators implemented as LC-ring oscillators, with $L_S/L_R$ inductor coils and a shared (time-multiplexed) resonator capacitor. The ring oscillators include matched Lsense/Lref drivers time-multiplexed (by out enable signals), to provide Lsense/Lref resonator excitation signals to the Lsense/Lref resonators, based on resulting Lsense/Lref resonance measurements (such as of resonance state) acquired by the ring oscillators from the Lsense/Lref resonators (establishing an LC-ring oscillator loop). Differential readout data is based on the time-multiplexed Lsense/Lref resonance measurements, corresponding respectively to $L_S/L_R$ coil inductances (such as based on Lsense/Lref resonator oscillation frequency). The ring oscillators can be implemented with a Schmitt trigger, converting analog resonance measurements into digital input to the Lsense/Lref drivers. Driver matching and layout matching can be used to improve accuracy. Effects of parasitic capacitance at the driver outputs can be suppressed by shorting or bootstrapping across the inactive $L_S/L_R$ coil inductances.

Figure 1A:
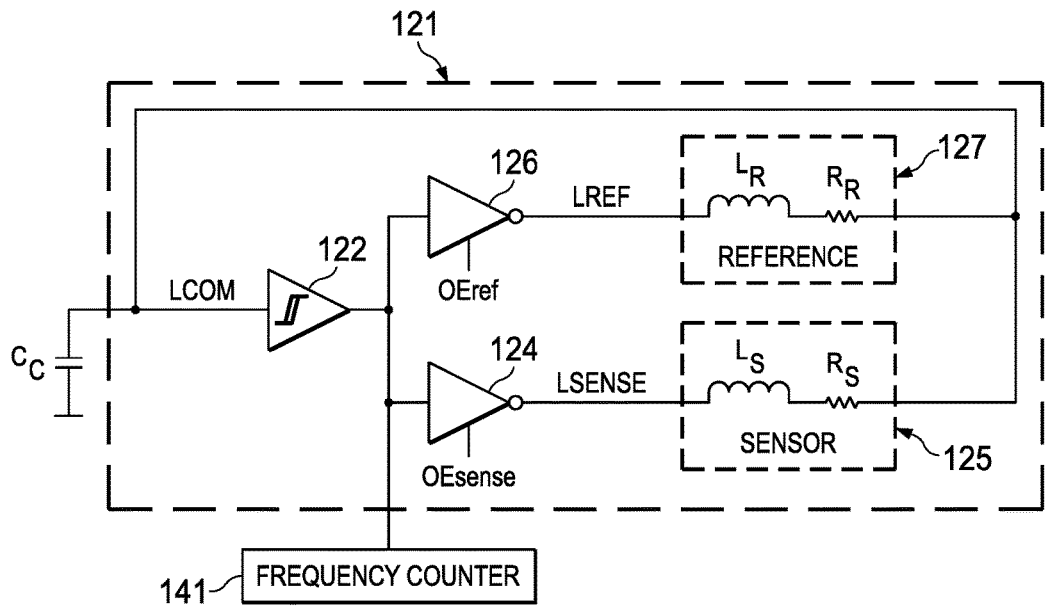
FIGS. 1A/1B illustrate an example embodiment of an inductive sensor [120] with differential inductance readout based on sense/reference LC-ring oscillators with a shared capacitor, including differential sense and reference resonators [$L_S/L_R$, Cc] driven by a Schmitt trigger [122] that converts analog resonance measurements from the resonators into digital resonator excitation signals driven out to the resonators by matched drivers [124, 126], which are enabled/disabled [OEsense/OEref] to time-multiplex [FIG. 1B, 124_OE, 126_OE] the sense/reference resonators (enabling operation with a shared capacitor).

FIGS. 1A/1B illustrate an example embodiment of an inductive sensor 120 with differential inductance readout based on sense/reference LC-ring oscillators with a shared capacitor. Differential sense (Lsense) and reference (Lref) resonators ($L_S/L_R$, Cc) are coupled to an inductance-to-data converter (IDC) including an IDC core 121.

The Lsense/Lref resonators and IDC core 121 form dual, sense/reference LC-ring oscillators in which the Lsense/Lref resonators are time-multiplexed to enable resonator operation with a shared capacitor Cc.

The Lsense and Lref resonators include $L_S$ and $L_R$ inductor coils, each coupled to common (shared) capacitor Cc, forming dual LC tank circuits. As illustrated, the resonator inductor coils are represented by an inductor element 125 that includes sense inductor coil $L_S$ and a loss factor represented by resistor $R_S$, and an inductor element 127 that includes reference inductor coil $L_S$ and a loss factor represented by resistor $R_R$. Thus, the resonator inductor coils can be referenced by either $L_S/L_R$, or 125/127.

Using sense and reference inductor coils $L_S$ and $L_R$ eliminates temperature drift. However, accurate differential inductance readout requires matching the $L_S$ and $L_R$ sensor inputs (measurements). Using sense/reference LC-ring oscillators with time-multiplexed Lsense/Lref resonators enables resonator operation with a shared capacitor, eliminating the need for accurately matched separate resonator capacitors. Moreover, LC-ring oscillators have a low noise floor, providing low phase jitter.

IDC core 121 drives the Lsense/Lref resonators as LC-ring oscillators using a Schmitt trigger 122 and matched Lsense and Lref inverting drivers 124, 126. Schmitt trigger 122 has an input coupled to the Lsense/Lref resonators at an LCOM input port coupled to common (shared) capacitor Cc, and an output coupled to the Lsense/Lref drivers 124, 126. Drivers 124/126 are coupled to respective Lsense/Lref resonators through LSENSE and LREF output ports, coupled to the $L_S$ and $L_R$ inductor coils.

Schmitt trigger 122 converts analog resonance measurements received from the Lsense/Lref resonators through the LCOM port, into digital Lsense/Lref resonator excitation signals. The matched Lsense/Lref inverting drivers 124, 126 drive the Lsense/Lref resonator excitation signals out of the LSENSE/LREF output ports to the resonators.

Figure 1B:
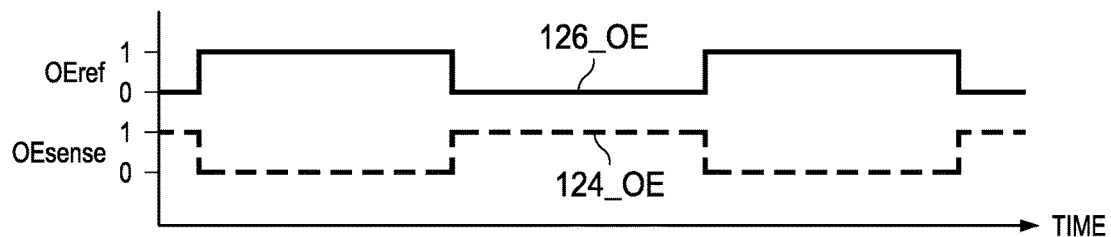

Lsense/Lref drivers 124, 126 are enabled/disabled by out enable signals OEsense/OEref to time-multiplex the Lsense/Lref resonator excitation signals, thereby time-multiplexing the Lsense/Lref resonators for operation with the shared capacitor Cc (see FIG. 1B, 124_OE, 126_OE). That is, when the inductance of the $L_S$ sense inductor coil is measured (Lsense resonance measurement input to the Schmitt trigger), only OEsense is active to enable the Lsense driver 124, while OEref is low, disabling Lref driver 126 (high output impedance). And, when the inductance of the $L_R$ reference inductor coil is measured (Lref resonance measurement input to the Schmitt trigger), only OEref is active to enable the Lref driver 124, while OEsense is low, disabling Lsense driver 126 (high output impedance).

In this time-multiplexing configuration for implementing the Lsense/Lref ring oscillators, Schmitt trigger 122 and the resonator capacitor Cc are shared. Mismatch between the Lsense/Lref drivers 124, 126 results in mismatch in propagation delay from Schmitt trigger input to the output, and mismatch in output impedance. Mismatch requirements for the delay can be relaxed under the condition that the delay is only a small fraction of the total oscillation period (for example, less than 2%). Mismatch in the output impedance can be relaxed if the input resistance of the drivers Rout<$\omega L_S$ and Rout<$\omega L_R$, where $\omega$=6.28*resonator oscillation frequency.

Not that the analog Schmitt trigger 122 in the ring oscillator core is a design choice to provide noise immunity. For some application with reduced noise immunity requirements, the analog Schmitt trigger can be eliminated.

Figure 2A:
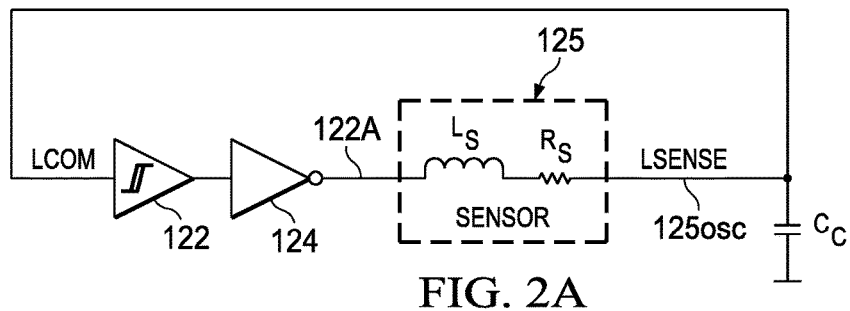
FIGS. 2A/2B illustrates, for the example inductive sensor of FIG. 1A, an example LC-ring oscillator operation for the sense resonator [$L_S$, Cc], including the relationship between the resonator oscillation frequency [125osc], and the Schmitt trigger levels [high/low], with the Schmitt trigger [122] converting resonance measurements [125c] from the sense resonator to digital sense resonator excitation signals [122A].

FIGS. 2A/2B illustrate, for the example inductive sensor of FIG. 1A, an example LC-ring oscillator operation for the Lsense (sense) resonator ($L_S$, Cc). The sense-side LC-ring oscillator includes Schmitt trigger 122 and inverting driver 124.

Schmitt trigger 122 receives Lsense resonance measurements 125osc from the Lsense resonator (Ls/Cc) through the LCOM port coupled to the shared capacitor Cc. The Schmitt trigger converts the Lsense resonance measurements 125osc to digital Lsense resonator excitation signals 122A.

Figure 2B:
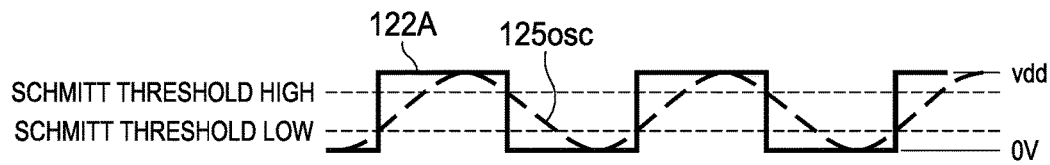

The actual oscillation mode for the Lsense resonator depends on the thresholds of the Schmitt trigger, relative to the levels of the Lsense resonator excitation signals output from the Lsense driver 124. FIG. 2B illustrates the relationship between resonator oscillation frequency 125osc (across the shared capacitor Cc), and the high/low Schmitt trigger levels used to generate the digital Lsense resonator excitation signals 122A. As soon as the input to Schmitt trigger 122 crosses threshold high level, the output of the buffer is driven low, and as soon as the input to Schmitt trigger 122 drops below the threshold low level, the output is driven high.

For example, the threshold high/low values can be set in relation to Vdd, such as a_high*Vdd and a_low*Vdd. Since the resonator oscillation signal across Cc is approximately the first harmonic of the square wave driving the resonator, and hence a sine wave, a_high and a_low determine the phase difference between the square wave driving the sensor and the sine wave at the input of the Schmitt trigger. For a_high=2/3 and a_low=1/3, the oscillation frequency is approximated by $$Fosc \approx \sqrt{(2L_S C_C)(1-R_S C_C)}$$

Referring to FIG. 1A, differential inductance readout is based on $L_S$ and $L_R$ coil inductances, derived from the time-multiplexed Lsense/Lref resonance measurements for the Lsense/Lref resonators. For the example embodiment, IDC core 121 includes differential readout implemented as a differential frequency counter 141.

Frequency counter 141 is coupled to receive the differential, time-multiplexed Schmitt trigger digital output (FIG. 2B). The Schmitt trigger digital output is based on the time-multiplexed Lsense/Lref resonance measurements input to Schmitt trigger 122. The frequency of the Schmitt trigger digital output depends on resonator oscillation frequency, which is a function of $L_S/L_R$ coil inductance.

While the example embodiment implements differential inductance readout derived from the differential (time-multiplexed) sense/reference LC-ring oscillators based on Lsense/Lref resonator oscillation frequency, other measures of $L_S/L_R$ coil inductance can be used. For example, while sensor inductance can be measured as changes back emf caused by induced eddy currents, sensor inductance can also be measured as changes in sensor losses resulting from induced eddy current losses, and changes in total sensor impedance based on changes in sensor inductance and loss factor.

Figure 3:
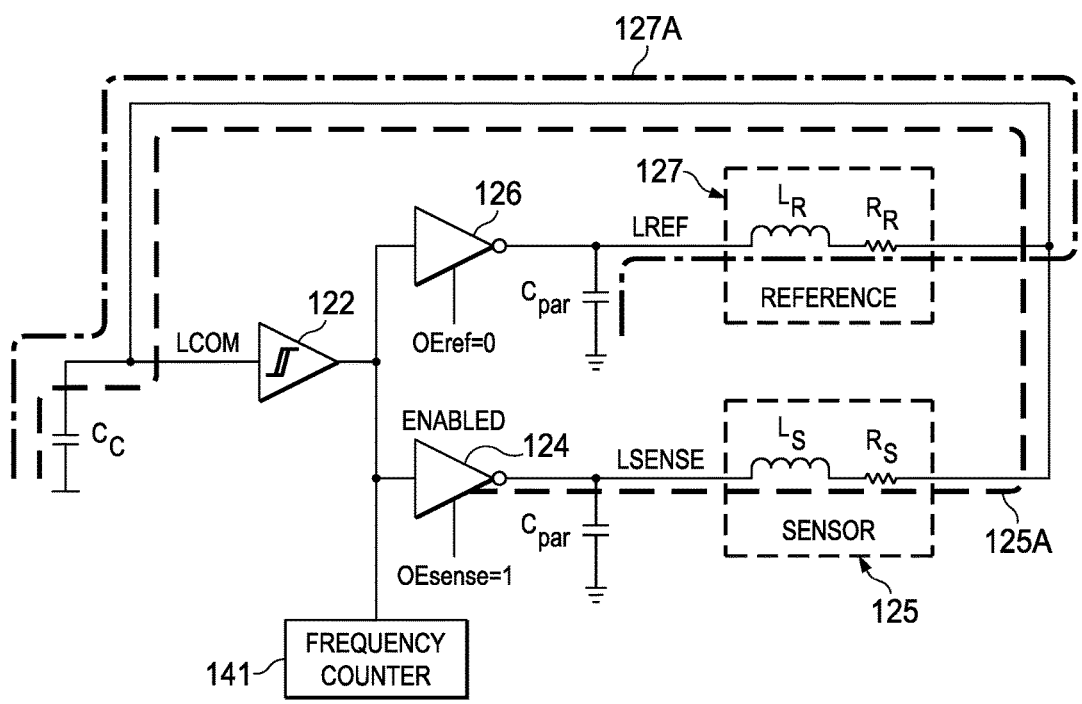
FIG. 3 illustrates, for the example embodiment of an inductive sensor [120] using sense/reference LC-ring oscillators with a shared capacitor, the effect of parasitic capacitance [Cpar] on the sense/reference drivers [124, 126], including introducing a second resonance mode.

FIG. 3 illustrates, for the example embodiment of an inductive sensor 120 using sense/reference LC-ring oscillators, the effect of parasitic capacitance Cpar on the sense/reference drivers 124, 126, including introducing a second resonance mode.

As illustrated, the time-multiplex phase is reading $L_S$ coil inductance (for the Lsense resonator), and hence the Lsense driver 124 is enabled to drive resonator excitation signals to the Lsense resonator. As such, Lsense driver 124 has low output impedance, while the Lref driver is disabled, and has a high output impedance (which can be referred to as a high-Z).

Ideally only the Lsense resonator ($L_S$ Cc) is active, which is indicated by dashed line 125A through the $L_S$ inductor coil. The parasitic capacitance Cpar that is loading the enabled Lsense driver 124 has no impact on the resonator oscillation frequency, and therefore no impact on inductance readout, due to the low output impedance of this driver. However as indicated by dashed line 127A, the parasitic capacitor Cpar loading the disabled Lref driver 126 (high-Z) adds a second resonant mode through the inactive $L_R$ inductor coil. Similarly, when Lref driver 126 is enabled, and the Lsense driver 124 is disabled (high-Z), the parasitic capacitor Cpar loading the disabled Lsense driver driving the Lsense resonator causes a second resonance mode through the inactive $L_S$ inductor coil. The second resonance mode is undesirable, since it can interfere with desired resonance mode.

Figure 4:
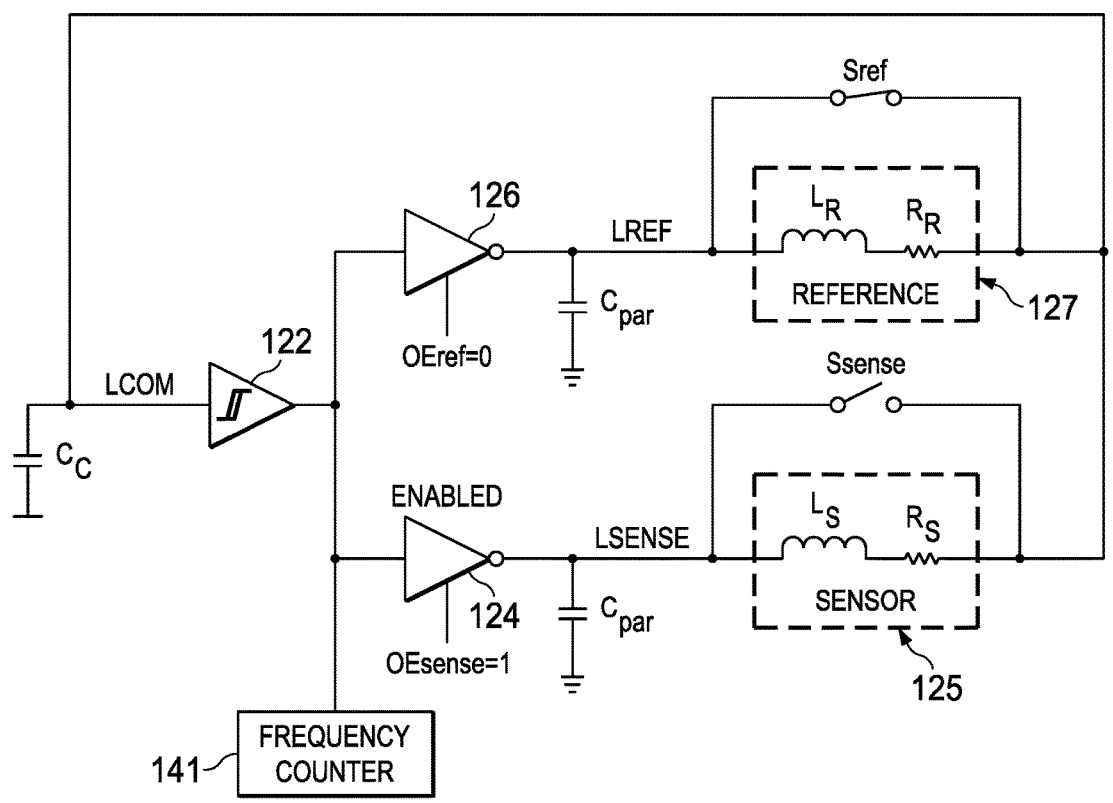
FIGS. 4 and 5 illustrate alternate example embodiments of an inductive sensor [120] using sense/reference LC-ring oscillators with a shared capacitor, including modifications to the sense/reference LC-ring oscillators to minimize the second resonance mode caused by parasitic capacitance [Cpar]
Figure 5:
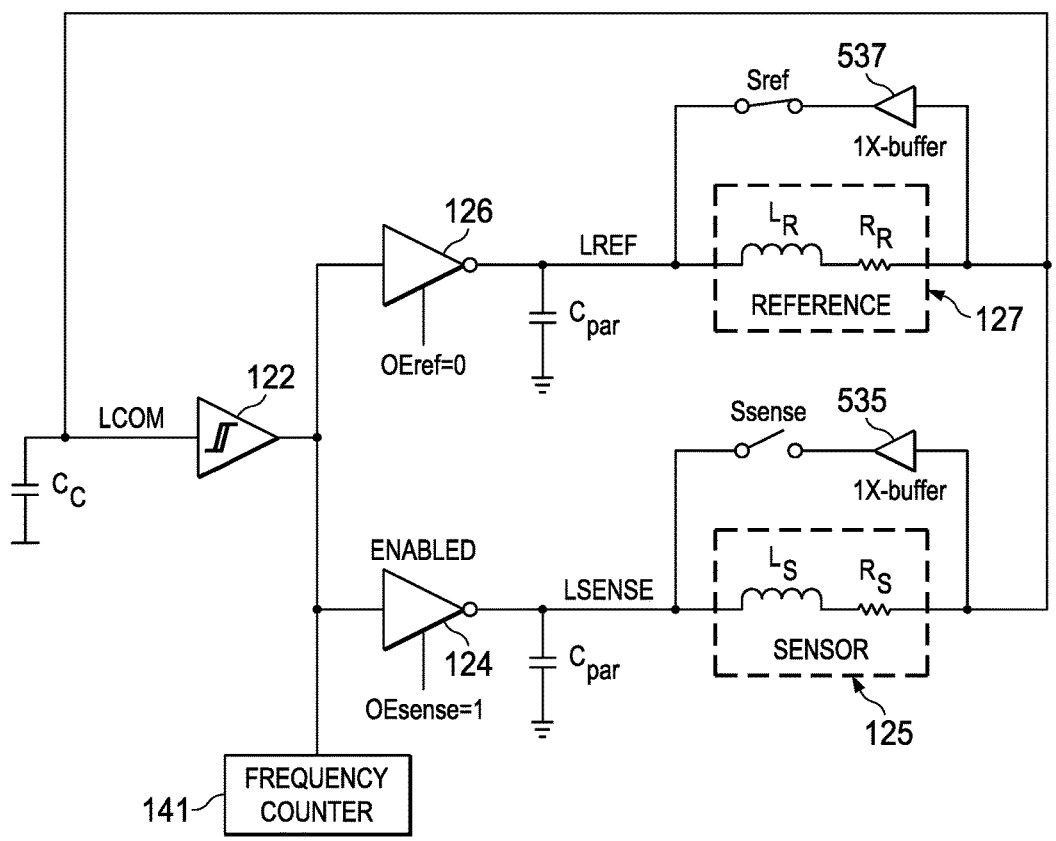

FIGS. 4 and 5 illustrate alternate example embodiments of an inductive sensor 120, including modifications to the sense/reference LC-ring oscillators to minimize the second resonance mode caused by parasitic capacitance. To suppress the second resonant mode, these alternate embodiments prevent current flowing through the parasitic capacitor and inactive $L_S/L_R$ inductor coil.

FIG. 4 illustrates an example embodiment in which the LC-ring oscillators include shorting switches Ssense, Sref connected across the $L_S$ and $L_R$ inductor coils to selectively short the inactive $L_S/L_R$ inductor coil. If a matched layout is used, both parasitic capacitors are matched as well, and the accuracy of the differential inductance measurement is not affected. For this implementation, the parasitic capacitance Cpar is added to the resonator capacitance Cc.

FIG. 5 illustrates an example embodiment in which the LC-ring oscillators include shorting switches Ssense, Sref connected in series with respective bootstrap buffer amplifiers 535, 537, across the $L_S$ and $L_R$ inductor coils, to selectively bootstrap the common capacitor voltage across the disabled resonator. The bootstrap amplifiers can be as simple as a source follower or emitter follower. The advantage of this implementation is that any mismatch between the parasitic capacitors does not impact overall accuracy.

Figure 6A:
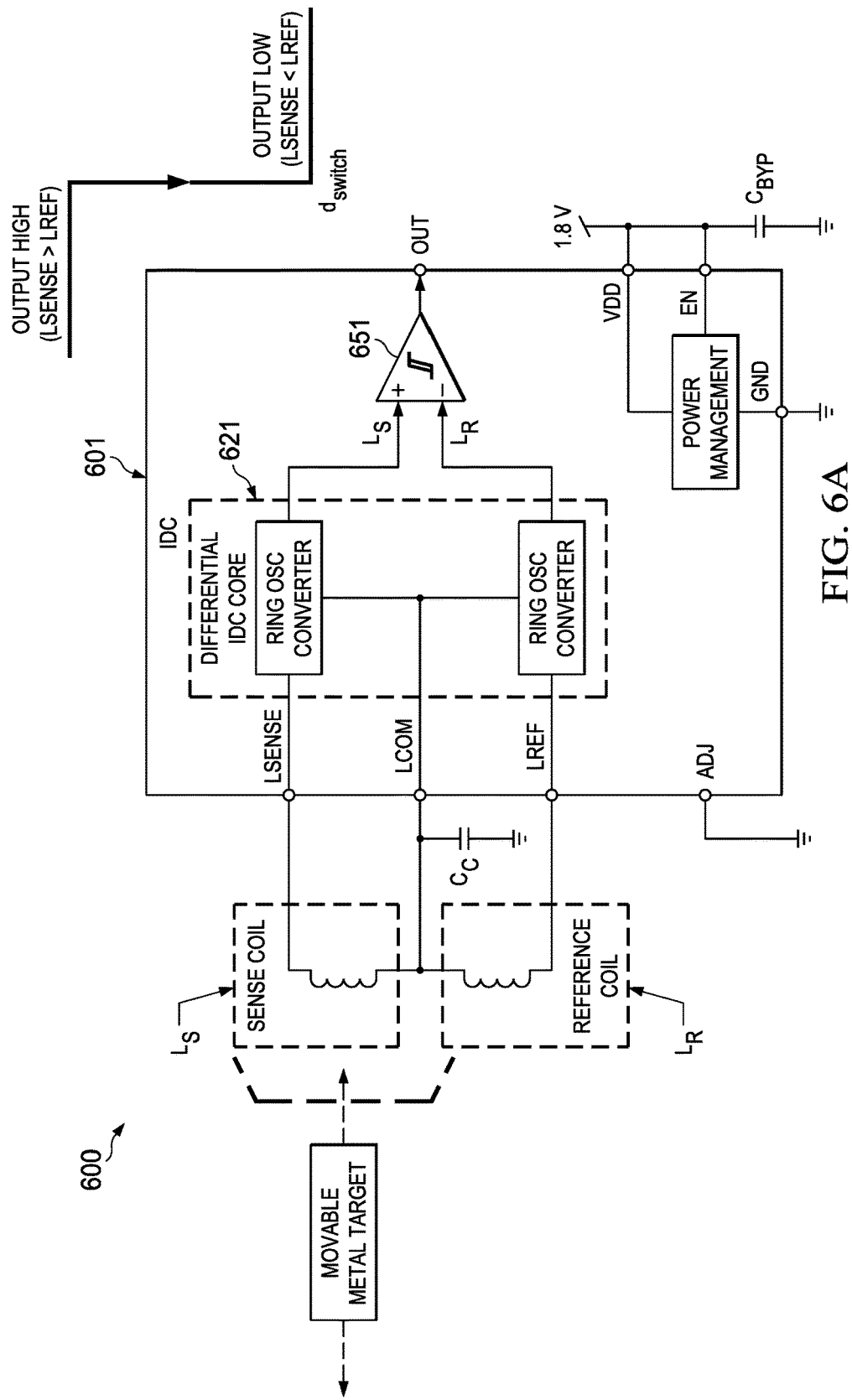
FIGS. 6A and 6B illustrate example embodiments of inductive sensor systems [600] providing differential inductance readout based on sense/reference LC-ring oscillators, including an IDC [601] coupled to sense/reference resonators, with LSENSE and LREF outputs coupled to $L_S$ and $L_R$ inductor coils, and an LCOM input coupled to a common (shared) resonator capacitor Cc, the IDC including a differential IDC core [621] with LC-ring oscillator converters to the sense/reference resonators to provide differential inductance readout for input to a digital Schmitt trigger [651] ($L_S$+ and $L_R$−).
Figure 6B:
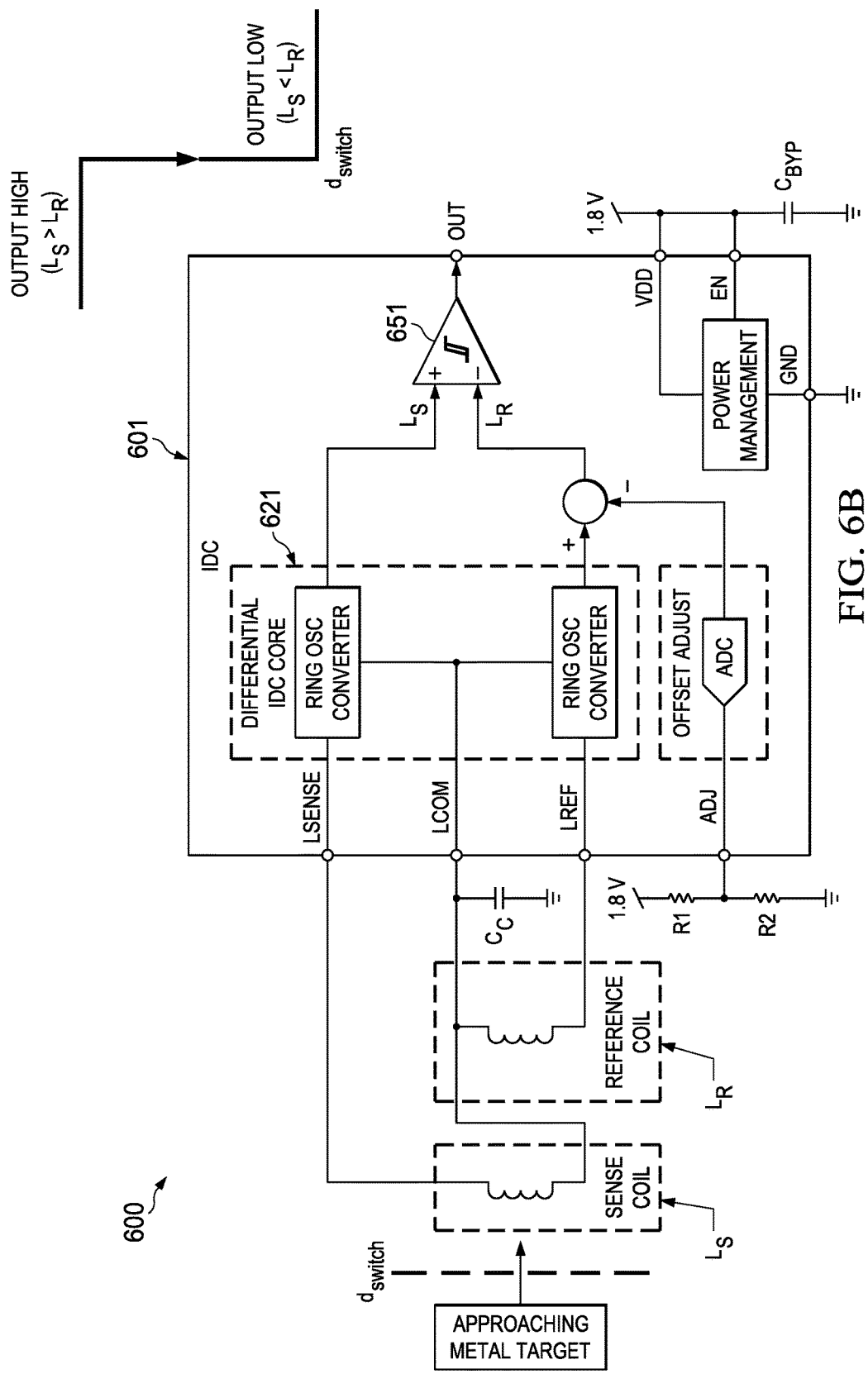

FIGS. 6A and 6B illustrate example embodiments of inductive sensor systems 600 for inductive proximity switching according to this Disclosure.

An IDC 601 is coupled to sense/reference resonators, with LSENSE and LREF outputs respectively coupled to $L_S$ and $L_R$ inductor coils, and an LCOM input coupled to a common (shared) resonator capacitor Cc. For this example proximity switching application, IDC 601 provides proximity switching based on a difference (or ratio) of $L_S$ and $L_R$ coil inductance.

IDC 601 provides differential inductance readout based on sense/reference LC-ring oscillators, as described in connection with FIGS. 2A/2B. A differential IDC core 621 includes sense and reference LC-ring oscillator converters incorporating the sense/reference resonators (sense/reference $L_S/L_R$ inductor coils).

Differential IDC core 621 provides differential inductance readout for input to a digital Schmitt trigger 651 ($L_S$+ and $L_R$−). As illustrated, the proximity switching response of the digital Schmitt trigger 651 is based on a difference ($L_S$−$L_R$) of $L_S$ and $L_R$ coil inductances provided as differential inductance readout from IDC core 621.

Alternatively, the digital Schmitt trigger 651 can be configured to switch based on a differential inductance readout that is a ratio of the $L_S$ and $L_R$ coil inductances. In addition, if differential inductance readout is a ratio of inductances $L_S/L_R$, such that, if $L_R$ is known, $L_S$ can be calculated, then the differential inductance ratio $L_S/L_R$, can be used directly for applications like weight scales, and for such implementations, the digital Schmitt trigger 651 is not required.

In summary, example embodiments of an inductive sensing system (such as for inductive proximity sensing/switching) include differential sense (Lsense) and reference (Lref) resonators with $L_S/L_R$ sense/reference inductor coils, and a common capacitor Cc coupled to the $L_S$ and $L_R$ inductor coils. An inductance-to-data converter (IDC) is coupled to the Lsense/Lref resonators, through LSENSE/LREF output ports, coupled respectively to the $L_S/L_R$ inductor coils, and through an LCOM input port to the common capacitor Cc. An Lsense driver, with an output coupled through the LSENSE output to the $L_S$ inductor coil, and with an input coupled to the LCOM input, is selectively enabled by an out enable signal OEsense. An Lref driver, with an output coupled through the LREF output to the $L_R$ inductor coil, and with an input coupled to the LCOM input, is selectively enabled by an out enable signal OEref. The OEsense and OEref signals are controlled to time-multiplex operation of the Lsense and Lref drivers.

The Lsense driver and Lsense resonator are operable as an Lsense ring oscillator to drive, when enabled by the OEsense signal, time-multiplexed Lsense resonator excitation signals through the LSENSE output to the Lsense resonator, to maintain Lsense resonator oscillation, based on resulting time-multiplexed Lsense resonance measurements acquired from the Lsense resonator through the LCOM input. The Lref driver and the Lref resonator are operable as an Lref ring oscillator to drive, when enabled by the OEref signal, time-multiplexed Lref resonator excitation signals through the LREF output to the Lref resonator, to maintain Lref resonator oscillation, based on resulting time-multiplexed Lref resonance measurements acquired from the Lref resonator through the LCOM input. Readout circuitry provides differential readout data based on the time-multiplexed Lsense and Lref resonance measurements, corresponding respectively to the inductances of the $L_S$ and $L_R$ inductor coils.

In other embodiments, the Lsense resonance measurements can correspond to a resonance state of the Lsense resonator, including a resonance state with steady-state oscillation, and the Lref resonance measurements can correspond to a resonance state of the Lref resonator, including a resonance state with steady-state oscillation. Differential readout data can be based on Lsense and Lref resonator oscillation frequency, as related respectively to the inductances of the $L_S/L_R$ inductor coils. The LC-ring oscillators can be implemented with a Schmitt trigger coupled to the LCOM input to convert time-multiplexed Lsense/Lref resonance measurements from the Lsense/Lref resonators, to digital Schmitt trigger output based on predetermined high and low thresholds, with the Lsense/Lref drivers coupled to receive the Schmitt trigger output. The Lsense/Lref drivers can be fabricated with matched circuitry to provide matched output impedance, and layout matching can be used for the Lsense/Lref drivers to match respective parasitic capacitances at the outputs of the Lsense/Lref drivers. Further, parasitic capacitances at the Lsense/Lref driver outputs can be suppressed by either: (a) Ssense/Sref shorting switches connected across respectively the $L_S/L_R$ inductor coils, and operable to selectively short the inactive inductor coil; or (b) Ssense/Sref shorting switches connected in series with respective bootstrap buffer amplifiers, across respectively the $L_S/L_R$ inductor coils, the Ssense/Sref switches operable to selectively bootstrap a voltage from the common capacitor Cc across the inactive inductor coil.

The Disclosure provided by this Description and the Figures sets forth example embodiments and applications illustrating aspects and features of the invention, and does not limit the scope of the invention, which is defined by the claims. Known circuits, functions and operations are not described in detail to avoid obscuring the principles and features of the invention. These example embodiments and applications, including example design considerations/choices/tradeoffs, can be used by ordinarily skilled artisans as a basis for modifications, substitutions and alternatives to construct other embodiments, including adaptations for other applications.

The invention claimed is:

1. An inductance-to-data converter (IDC) integrated circuit suitable for operation with external sense and reference resonators Lsense and Lref, the Lsense and Lref resonators including respectively a sense inductor coil $L_S$, and a reference inductor coil $L_R$, and including a common resonator capacitor Cc, the IDC circuit comprising
    an LSENSE output for coupling to the $L_S$ inductor coil;
    an LREF output for coupling to the $L_R$ inductor coil;
    an LCOM input for coupling to the resonator capacitor Cc;
    an Lsense driver with an output coupled to the LSENSE output, and an input coupled to the LCOM input, the Lsense driver selectively enabled by an out enable signal OEsense, and
    an Lref driver with an output coupled to the LREF output, and an input coupled to the LCOM input, the Lref driver selectively enabled by an out enable signal OEref,
    the OEsense and OEref signals controlled to time-multiplex operation of the Lsense and Lref drivers;

the Lsense driver operable with the Lsense resonator as an Lsense ring oscillator to drive, when enabled by the OEsense signal, time-multiplexed Lsense resonator excitation signals through the LSENSE output, based on time-multiplexed Lsense resonance measurements received from the LCOM input; and the Lref driver operable with the Lref resonator as an Lref ring oscillator to drive, when enabled by the OEref signal, time-multiplexed Lref resonator excitation signals through the LREF output, based on time-multiplexed Lref resonance measurements received from the LCOM input; and readout circuitry to provide differential readout data based on the time-multiplexed Lsense and Lref resonance measurements, corresponding respectively to inductances of the $L_S$ and $L_R$ inductor coils.

2. The integrated circuit of claim 1,
wherein the LSENSE output is coupled to the external $L_S$ inductor coil;
wherein the LREF output is coupled to the external $L_R$ inductor coil; and
wherein the LCOM input is coupled to the common resonator capacitor; and
wherein the time-multiplexed Lsense resonator excitation signals are driven through the LSENSE output to the Lsense resonator, to maintain Lsense resonator oscillation; and
wherein the time-multiplexed Lref resonator excitation signals are driven through the LREF output to the Lref resonator, to maintain Lref resonator oscillation.

3. The integrated circuit of claim 2, wherein:
the Lsense resonance measurements correspond to a resonance state of the Lsense resonator, including a resonance state with steady-state oscillation; and
the Lref resonance measurements correspond to a resonance state of the Lref resonator, including a resonance state with steady-state oscillation.

4. The integrated circuit of claim 1, wherein the readout circuitry provides differential readout data based on Lsense and Lref resonator oscillation frequency, as related respectively to the inductances of the $L_S$ and $L_R$ inductor coils.

5. The integrated circuit of claim 1, further comprising:
a Schmitt trigger coupled to the LCOM input to convert the time-multiplexed Lsense and Lref resonance measurements from the Lsense and Lref resonators, to a digital Schmitt trigger output, based on predetermined high and low thresholds, provided to the Lsense and Lref drivers.

6. The integrated circuit of claim 1,
wherein the Lsense and Lref drivers are fabricated with matched circuitry to provide matched output impedance; and
wherein layout matching is used for the Lsense and Lref drivers to match respective parasitic capacitances at the outputs of the Lsense and Lref drivers.

7. The integrated circuit of claim 2, further comprising one of:
Ssense and Sref shorting switches connected across respectively the $L_S$ and $L_R$ inductor coils, and operable to selectively short an inactive one of the inductor coils; and
Ssense and Sref shorting switches connected in series with respective bootstrap buffer amplifiers, across respectively the $L_S$ and $L_R$ inductor coils, the Ssense and Sref switches operable to selectively bootstrap a voltage from the common capacitor Cc across an inactive one of the inductor coils.

8. The integrated circuit of claim 2, for use as an inductive switch,
wherein the $L_S$ inductor coil is disposed to detect proximity of a conductive target; and
wherein the readout circuitry provides differential readout data corresponding to a proximity event in which the target is at a pre-defined proximity to the $L_S$ inductor coil.

9. An inductive sensing system, comprising
differential sense (Lsense) and reference (Lref) resonators, including
a sense inductor coil $L_S$;
a reference inductor coil $L_R$; and
a common capacitor Cc coupled to the $L_S$ and $L_R$ inductor coils;
an inductance-to-data converter (IDC) coupled to the Lsense and Lref resonators, through LSENSE and LREF outputs coupled respectively to the $L_S$ and $L_R$ inductor coils, and through an LCOM input coupled to the common capacitor Cc, including
an Lsense driver with an output coupled through the LSENSE output to the $L_S$ inductor coil, and an input coupled to the LCOM input, the Lsense driver selectively enabled by an out enable signal OEsense, and
an Lref driver with an output coupled through the LREF output to the $L_R$ inductor coil, and an input coupled to the LCOM input, the Lref driver selectively enabled by an out enable signal OEref,
the OEsense and OEref signals controlled to time-multiplex operation of the Lsense and Lref drivers;
the Lsense driver and the Lsense resonator operable as an Lsense ring oscillator to drive, when enabled by the OEsense signal, time-multiplexed Lsense resonator excitation signals through the LSENSE output to the Lsense resonator, to maintain Lsense resonator oscillation, based on resulting time-multiplexed Lsense resonance measurements acquired from the Lsense resonator through the LCOM input; and
the Lref driver and the Lref resonator operable as an Lref ring oscillator to drive, when enabled by the OEref signal, time-multiplexed Lref resonator excitation signals through the LREF output to the Lref resonator, to maintain Lref resonator oscillation, based on resulting time-multiplexed Lref resonance measurements acquired from the Lref resonator through the LCOM input;
the IDC including readout circuitry to provide differential readout data based on the time-multiplexed Lsense and Lref resonance measurements, corresponding respectively to the inductances of the $L_S$ and $L_R$ inductor coils.

10. The system of claim 9, wherein:
the Lsense resonance measurements correspond to a resonance state of the Lsense resonator, including a resonance state with steady-state oscillation; and
the Lref resonance measurements correspond to a resonance state of the Lref resonator, including a resonance state with steady-state oscillation.

11. The system of claim 9, wherein the readout circuitry provides differential readout data based on Lsense and Lref resonator oscillation frequency, as related respectively to the inductances of the $L_S$ and $L_R$ inductor coils.

12. The system of claim 9, wherein the LC-ring oscillators are implemented with a Schmitt trigger coupled to the LCOM input to convert the time-multiplexed Lsense and Lref resonance measurements from the Lsense and Lref resonators, to a digital Schmitt trigger output, based on predetermined high and low thresholds, provided to the Lsense and Lref drivers.

13. The system of claim 9,
wherein the Lsense and Lref drivers are fabricated with matched circuitry to provide matched output impedance; and
wherein layout matching is used for the Lsense and Lref drivers to match respective parasitic capacitances at the outputs of the Lsense and Lref drivers.

14. The system of claim 9, further comprising one of:
Ssense and Sref shorting switches connected across respectively the $L_S$ and $L_R$ inductor coils, and operable to selectively short an inactive one of the inductor coils; and
Ssense and Sref shorting switches connected in series with respective bootstrap buffer amplifiers, across respectively the $L_S$ and $L_R$ inductor coils, the Ssense and Sref switches operable to selectively bootstrap a voltage from the common capacitor Cc across an inactive one of the inductor coils.

15. The system of claim 9, for use as an inductive switch,
wherein the $L_S$ inductor coil is disposed to detect proximity of a conductive target; and
wherein the readout circuitry provides differential readout data corresponding to a proximity event in which the target is at a pre-defined proximity to the $L_S$ inductor coil.

16. A method for inductive sensing suitable for use with sense and reference resonators Lsense and Lref, the Lsense and Lref resonators including respectively a sense inductor coil $L_S$, and a reference inductor coil $L_R$, and including a common resonator capacitor Cc, comprising
driving the Lsense resonator as a time-multiplexed Lsense ring oscillator, including driving time-multiplexed Lsense resonator excitation signals into the Lsense resonator, to maintain Lsense resonator oscillation, based on resulting time-multiplexed Lsense resonance measurements input to the Lsense ring oscillator from the Lsense resonator; and
driving the Lref resonator as a time-multiplexed Lref ring oscillator, including driving time-multiplexed Lref resonator excitation signals into the Lref resonator, to maintain Lsense resonator oscillation, based on resulting time-multiplexed Lref resonance measurements input to the Lref ring oscillator from the Lref resonator;
time-multiplexing the operation of the Lsense and Lref ring oscillators to enable sharing the common resonator capacitor Cc by the Lsense and Lref resonators; and
providing differential readout data based on the time-multiplexed Lsense and Lref resonance measurements, corresponding respectively to inductances of the $L_S$ and $L_R$ inductor coils.

17. The method of claim 16, wherein:
the Lsense resonance measurements correspond to a resonance state of the Lsense resonator, including a resonance state with steady-state oscillation; and
the Lref resonance measurements correspond to a resonance state of the Lref resonator, including a resonance state with steady-state oscillation.

18. The method of claim 16, wherein the differential readout data is based on Lsense and Lref resonator oscillation frequency, as related respectively to the inductances of the $L_S$ and $L_R$ inductor coils.

19. The method of claim 16, where the LC-ring oscillators are implemented with a Schmitt trigger coupled to the LCOM input to convert the time-multiplexed Lsense and Lref resonance measurements from the Lsense and Lref resonators, to a digital Schmitt trigger output, based on predetermined high and low thresholds, provided to the Lsense and Lref drivers.

20. The method of claim 16, further comprising one of:
selectively shorting an inactive one of the inductor coils; and
selectively bootstrapping a voltage from the common resonator capacitor Cc across an inactive one of the inductor coils.

21. The method of claim 16, for use in inductive switching,
wherein the $L_S$ inductor coil is disposed to detect proximity of a conductive target; and
wherein the differential readout data corresponding to a proximity event in which the target is at a pre-defined proximity to the $L_S$ inductor coil.

* * * * *